No. 768,270. PATENTED AUG. 23, 1904.
H. M. COSEY.
HAY TEDDER.
APPLICATION FILED JUNE 8, 1904.
NO MODEL.

Witnesses
H. H. Hunt.
Millard Haskell.

Inventor
Henry M. Cosey,
By Walter N. Haskell,
Attorney

No. 768,270. Patented August 23, 1904.

UNITED STATES PATENT OFFICE.

HENRY M. COSEY, OF STERLING, ILLINOIS.

HAY-TEDDER.

SPECIFICATION forming part of Letters Patent No. 768,270, dated August 23, 1904.

Application filed June 8, 1904. Serial No. 211,588. (No model.)

*To all whom it may concern:*

Be it known that I, HENRY M. COSEY, a citizen of the United States, residing at Sterling, in the county of Whiteside and State of Illinois, have invented certain new and useful Improvements in Hay-Tedders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to hay-tedders, and is specially designed for use in that class of such machines wherein the hay is scattered by a series of substantially vertical tedder-arms provided at their lower ends with spring teeth or forks and adapted to successively stir the hay with a kicking movement while the machine is in motion.

In practice in machines of this class in going in the same direction with a strong wind the hay is blown up into the tedder-arms, choking the crank-shaft by which they are operated until the driving-wheels slide upon the ground and the machine becomes inoperative. It is quite common for the operator during a high wind to work only against the wind, operating the machine across the field in the direction from which the wind comes and returning in the direction of the wind with the machine out of gear. In doing this a great deal of time is lost, and it is to overcome this difficulty that my invention is designed.

Figure 1:
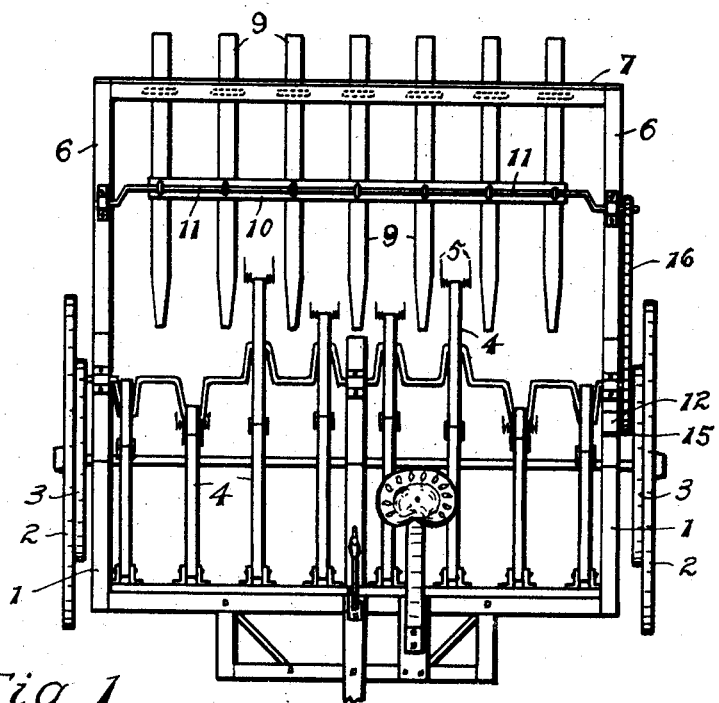
Figures 2, 3, 4:
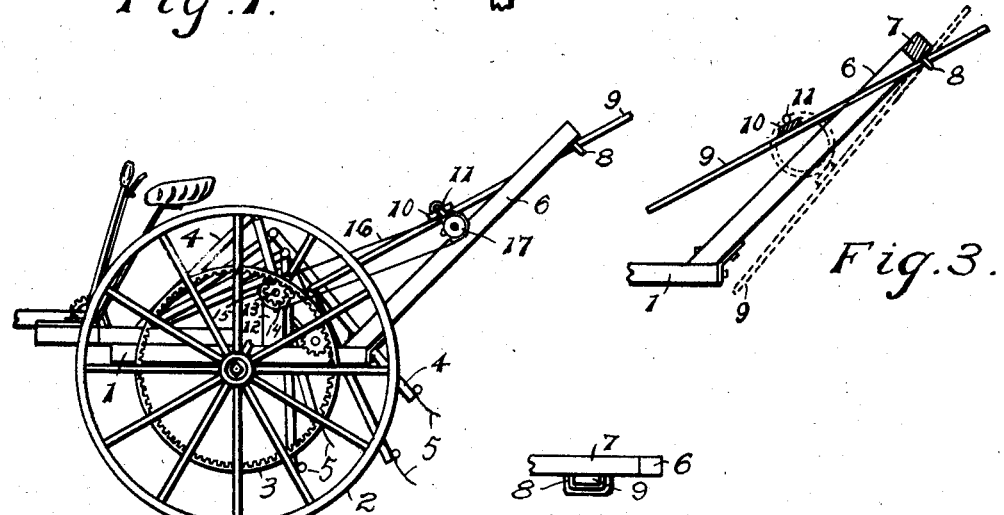

In the drawings, Figure 1 is a plan view of a machine embodying my device. Fig. 2 is a side elevation thereof. Fig. 3 is a detail in side elevation, showing the movement of the slats 9. Fig. 4 is an upper end view of one of the slats 9 and support therefor.

1 represents the frame of the machine supported on carrying-wheels 2, provided with internal gears 3 on their inner faces. 4 4 are the usual fork-arms provided with spring-forks 5.

Extending rearwardly from the frame 1 is a pair of supports 6, united at their upper ends by a cross-piece 7, having on its rear face a series of loops 8. Loosely held by the loops 8 is a series of slats 9, preferably constructed of wood, such slats being rigidly united by a cross-piece 10. A continuous crank-shaft 11 is journaled at each end in the supports 6 and loosely attached to the cross-piece 10, so as to cause the slats 9 to simultaneously vibrate upon the rotation of such shaft. On the frame 1 is supported a short post 12, in the upper end of which is journaled a short shaft 13, having fixed on its outer end a gear-pinion 14, meshing with and actuated by the gear 3 on one of the wheels 2. Between the pinion 14 and post 12 is a sprocket-wheel 15, also fixed on the shaft 13 and connected by a sprocket-chain 16 with a sprocket-wheel 17 on the end of the crank-shaft 11. By this means rotation is imparted to the shaft 11 while the machine is in operation. This mechanism can be duplicated at the other side of the machine, if desired.

The slats 9 are so disposed upon the cross-piece 7 as to alternate with the fork-arms 4, and the forward ends of the slats are tapered so that the forks will not come in contact therewith in their upward movement. By the vibration of the slats 9 they are caused to move in a downward and slightly rearward direction so as to fan or beat the hay downwardly and prevent its being blown into the tedder mechanism. The operation of the slats is shown in Fig. 3, the upper ends of the slats projecting sufficiently beyond the loops 8 to prevent their release therefrom in the extreme downward movement of the slats. The slats are of a sufficient length to prevent the hay from being blown over the upper ends thereof.

What I claim as my invention, and desire to secure by Letters Patent of the United States, is—

In a hay-tedder, the combination of the supports 6, secured on the frame of the tedder; the cross-piece 7, connecting the upper ends of the supports 6; the slats 9, loosely secured to the cross-piece 7, and rigidly united by the cross-piece 10; the crank-shaft 11, supported in the supports 6, and loosely secured to the cross-piece 10; and means for rotating the shaft 11; substantially as shown and set forth.

In testimony whereof I affix my signature in presence of two witnesses.

HENRY M. COSEY.

Witnesses:
I. S. WEAVER,
CHAS. H. WOODBURN.